(12) United States Patent
Nigro (10) Patent No.: US 7,595,799 B2
(45) Date of Patent: Sep. 29, 2009

(54) PROCESS FOR CREATING FROM A MESH AN ISOTOPOLOGIC SET OF PARAMETERIZED SURFACES

(75) Inventor: Vincent Nigro, Aix-En-Provence (FR)

(73) Assignee: Dassault Systemes, Suresnes Cedex (FR)

( * ) Notice: Subject to any disclaimer, the term of this patent is extended or adjusted under 35 U.S.C. 154(b) by 0 days.

(21) Appl. No.: 11/197,696

(22) Filed: Aug. 4, 2005

(65) Prior Publication Data

US 2007/0030267 A1 Feb. 8, 2007

(51) Int. Cl.
*G06T 17/00* (2006.01)
(52) U.S. Cl. .................................................. 345/420
(58) Field of Classification Search ................ None
See application file for complete search history.

(56) References Cited

U.S. PATENT DOCUMENTS

| | | | | |
|---|---|---|---|---|
| 6,037,949 A * | 3/2000 | DeRose et al. | ............. | 345/582 |
| 6,389,154 B1 * | 5/2002 | Stam | ............. | 382/108 |
| 6,806,874 B2 * | 10/2004 | Biermann et al. | ............. | 345/420 |
| 6,950,099 B2 * | 9/2005 | Stollnitz et al. | ............. | 345/423 |
| 7,170,516 B2 * | 1/2007 | Stollnitz et al. | ............. | 345/423 |
| 2004/0189633 A1 * | 9/2004 | Sederberg | ............. | 345/418 |

OTHER PUBLICATIONS

Charles Loop, "Second Order Smoothness Over Extraordinary Vertices," Jul. 8, 2004, Proceedings of the 2004 Eurographics/ACM SIGGRAPH Symposium on Geometry Processing, p. 165-174.*
Jörg Peters, "C2 free-form surfaces of degree (3,5)," Feb. 2002, Computer Aided Geometric Design, vol. 19, Issue 2, pp. 113-126.*
Tony DeRose, Michael Kass, Tien Truong, "Subdivision Surfaces in Character Animation,"Jul. 1998, Proceedings of the 25th Annual Conference on Computer Graphics and Interactive Techniques, p. 85-94.*
Charles Loop, "Second Order Smoothness Over Extraordinary Vertices," July 8, 2004, Proceedings of the 2004 Eurographics/ACM SIGGRAPH Symposium on Geometry Processing, p. 165-174.*

* cited by examiner

*Primary Examiner*—Ulka Chauhan
*Assistant Examiner*—Jason M Repko
(74) *Attorney, Agent, or Firm*—Isabel Cantallops; Baker & Hostetler LLP (57) ABSTRACT

A process for creating from a mesh an isotopologic set of parameterized surfaces includes providing a mesh having a plurality of vertices connected by edges, defining faces, the vertices comprising regular vertices of valence 4 and irregular vertices of valence different from 4. The mesh may have a sharpness value defined on at least one vertex or edge, with a default value, the sharpness being representative of the attractiveness of the vertex or edge on the surface modeled by the mesh. The sharpness may measure the difference between the mesh as it stands at a given subdivision level and the initial mesh.

13 Claims, 5 Drawing Sheets

PROCESS FOR CREATING FROM A MESH AN ISOTOPOLOGIC SET OF PARAMETERIZED SURFACES

FIELD OF THE INVENTION

The invention relates to the field of computer-aided design, and more specifically to computer-aided creation of parameterized surfaces from a mesh.

BACKGROUND

A number of systems and programs are offered on the market for the design of parts or assemblies of parts, such as the one provided by the applicant under the trademark CATIA. These so-called computer-aided design (CAD) systems allow a user to construct and manipulate complex three-dimensional (3D) models of parts or assembly of parts.

Creation of 3D computer graphics involves various steps, including modeling and process steps (subdivision of base meshes, conversion into parametric surfaces, rendering . . . ).

A number of different modeling techniques can be used to create a model of an assembly. These techniques include solid modeling, wire-frame modeling, and surface modeling. Solid modeling techniques provide for topological 3D models, where the 3D model is a collection of interconnected edges and faces, for example. Geometrically, a 3D solid model is a collection of trimmed or delimited surfaces that defines a closed skin. The trimmed surfaces correspond to the topological faces bounded by the edges. The closed skin defines a bounded region of 3D space filled with the part's material. Wire-frame modeling techniques, on the other hand, can be used to represent a model as a collection of simple 3D lines, whereas surface modeling can be used to represent a model as a collection of exterior surfaces. CAD systems may combine these, and other, modeling techniques, such as parametric modeling techniques. CAD systems thus provide a representation of modeled objects using edges or lines, in certain cases with faces. The modeled objects comprises a number of lines or edges; these may be represented in various manners, e.g. non-uniform rational B-splines (NURBS), Bezier curves or other algorithms describing a curve.

Regarding process steps, CAD programs generally make use of base meshes during the modeling of objects. Base meshes are networks of interconnected elementary polygons, such as triangles or quadrangles.

A base mesh is modified by the user during design to obtain the required model, and then is converted into a plurality of parametric surfaces such as NURBS or B-Splines.

Concerning the modeled products: modern consumer products are often characterized by smoothly flowing shapes, the complexity of which exceeds simple analytical surfaces, such as planes, boxes and cylinders. Such products are instead typically modeled using spline curves and surfaces or the like. When designing a product, smoothness of object surfaces is a main concern. Consequently, 3D modelers usually have an assortment of tools for creating smooth surfaces.

In the following, "curvature" will be used as a geometry term indicating the extent that a curve or surface deviates from perfect straightness or flatness. Curvature is usually measured as the inverse of a local osculating radius. Thus, a curve has a low curvature and a large radius when it is slightly bent only, and has a high curvature and a small radius if bent sharply. While curvature is constant for arcs, circles, or for surfaces based thereon; the curvature of more complex curves such as splines (and surfaces based thereon) continually changes along the length of the curve.

Furthermore, the term "continuity" will be used for describing offsets (or relationships) between points along a curve or on a surface and also between abutting curves or surfaces. Such relationships may fall into different levels of continuity, which are usually: C0, C1, and C2. C0 denotes a position continuity only (as in the case of abutting curves/surfaces). Curves show in this case a kink at the C0 point. Similarly, surfaces have a sharp crease along the C0 seam. Abutting curves and surfaces touch one another, but they have no curvature similarities. C1 denotes a continuity level augmented with tangent continuity, and C2 adds the curvature continuity. Where curvatures on both sides of a point in a curve are equal, the curve is seamless.

In addition, it will be made reference to G0, G1, and G2 "geometrical" continuities, which slightly differ on the mathematical point of view, as known in the art. For example, two joining curve segments have Gn continuity if nth order derivatives of respective curves have the "same direction" at the join (proportionality defined by some matrix is sufficient, equality is not required). As a result, Cn implies Gn while the reciprocal is not necessarily true.

Amongst the core techniques of surface modeling, one generally makes use of piecewise low-order algebraic surfaces or implicit patches. Patches are typically controlled via a grid of control points, whereby they can be deformed. An important issue in using patches is that patches must be adequately joined to ensure geometric continuity along the patch boundaries. Typically, the patch cells are recursively subdivided to make it possible to adapt the local curvature to a given continuity requirement.

In numerous applications (such as computer graphics), subdivision surfaces such as Catmull-Clark, are used to approximate a surface derived from a base mesh. In particular, Catmull-Clark subdivision surfaces are now a standard for smooth free-form surface modeling. Subdivision surfaces are used to create smooth surfaces out of arbitrary meshes, that is, with arbitrary topology. They are defined as the limit of an infinite refinement process. A key concept is refinement: by repeatedly refining an initial polygonal mesh, a sequence of meshes is generated that converges to a resulting subdivision surface. Each new subdivision step generates a new mesh that has more polygonal elements and is smoother. In particular, Catmull-Clark subdivision surfaces can be seen as a generalization of bi-cubic uniform B-splines. An important point is that the generated mesh will mainly consist of quadrilaterals, so that the expected valence (or coordination number) of an ordinary vertex is 4.

In this respect, a distinction is sometimes made between open and closed vertex. Open/closed vertices are concepts known in the art. In short: suppose a vertex v be surrounded and joined by edges E1, E2, En+1, such that En+1 =E1, said vertex is considered to be closed if none of the edges is a sharp edge.

However, in the field of CAD, subdivision surfaces are not commonly accepted as they are not parametric. Thus, CAD systems provide conversion algorithms to convert a subdivision surface into a parametric surface consisting of a set of surface patches, such as NURBS patches.

A number of conversion algorithms are described in the literature (see for example: J. Peters: Patching Catmull-Clark Meshes, Siggraph 2000). However, said existing conversion algorithms are not designed for taking in account open base meshes, that is, comprising open vertices or edges (for example: sharp edges or frontiers) and comprising tri-rectangular patterns (also called triquad).

In addition, the resulting parametric surfaces give rise to an insufficient quality of continuity. Indeed, those surfaces are everywhere curvature continuous except at points corresponding to vertices not incident on four edges (extraordinary vertices) of the initial base mesh.

Yet, parallel to the present invention, a method has been disclosed which involves discrete Fourier transform (C. Loop : Second Order Smoothness over Extraordinary vertices, Eurographics Symposium on Geometry Processing (2004)). However, this approach does manifestly apply to closed extraordinary vertices only.

Hence, in short, there is a need for a process for creating from a mesh an isotopologic set of parameterized surfaces, said process being suitable for treating open base mesh, possibly having trti-rectangular patterns. Said process should further provide parametric surfaces which are adapted to various types of faces present in the base mesh.

In addition, said process should preferably satisfy a given geometrical continuity Gi (for example G1 or G2) requirement and use a local, linear resolution algorithm, so as to ensure its stability, should high valence vertices be contemplated.

Furthermore, to the best of the knowledge of the inventor, whilst suggesting some features and variations relevant to creation of parametric surfaces in general, the prior art has not disclosed some of the highly advantageous features of the present invention discussed herein.

SUMMARY OF THE INVENTION

The invention is directed to a process for creating from a mesh an isotopologic set of parameterized surfaces. Said process comprises a step of providing a mesh having a plurality of vertices connected by edges, defining faces, the vertices comprising regular vertices of valence 4 and irregular vertices of valence different from 4. The mesh provided is for example a Catmull-Clark subdivided mesh. Said mesh further has sharpness values defined on vertices and/or edges. Sharpness is representative of the attractiveness of the vertex or edge on the surface modeled by the mesh. The sharpness measures for example the difference between the initial mesh and the limit subdivision surface, or between the initial mesh and the mesh as it stands at a given subdivision level. The process further comprises providing at least three different types of parameterized surfaces; and for a face with regular vertices and having only a first value of sharpness (for example a default value) on vertices and/or edges of the face, applying a first type of parameterized surface;

for a face with regular vertices and at least one vertex or edge with a second (fro example a non-default) value of sharpness, applying a second type of parameterized surface; and for a face with at least one irregular vertex, applying a third type of parameterized surface.

The steps of applying surfaces hence allow for working from a base mesh having an arbitrary topology and possibly use Catmull-Clark subdivision surfaces. Yet, the face-surface mapping provides that the initial topology is respected.

A typical example of a face with regular vertices and a default value of sharpness on vertices and edges is the case of a face having vertices with valence 4 and non-sharp edges.

Typical examples of a face with regular vertices and at least one vertex or edge with a non-default value of sharpness are (i) faces having at least a vertex of valence 3 lying at the join of two sharp edges and (ii) faces with a vertex of valence 4 joined by a sharp edge. Notice that a vertex of valence 3 lying on a sharp edge is not considered as an irregular vertex. Such faces (which includes the case of faces with open vertices) are thus provided a specific treatment.

A typical example of a face with at least one irregular vertex is a face comprising an extraordinary vertex joined by non-sharp edges. Faces with extraordinary vertices are thus explicitly contemplated by the algorithm and applied an adapted type of parametric surface.

Furthermore, as the above scheme considers both regular and irregular vertices, it makes it possible to take tri-rectangular meshes into account.

Hence a progressive parameterization (thus optimized) is recovered. The type and so the complexity of surface applied is chosen in respect of a local value of sharpness and the nature of vertices, thereby providing an adapted sophistication of the modeled surface. This notably prevents from providing an exceeding number of control points.

Accordingly, the number of control points of the first type of parameterized surface is preferably less than the number of control points of the second and the third types of parameterized surface, due to the relative simplicity of such surfaces.

Also, the number of control points of the third type of parameterized surface is preferably greater than the number of control points of the first and second types of parameterized surface.

Owing to the flexibility offered by the various types of surfaces applied, the first, the second, and the third types of surfaces may, in a variant, be of the B-spline type, yet with different nodal vectors.

In an embodiment, at the steps of applying surfaces: each the parametric surface applied has an internal continuity Cj at least equal to a required geometrical continuity Gi. It is thereby meant that j is larger or equal to i, that is, said internal continuity at least encompasses the required geometrical continuity. In contrast, the geometrical continuity between at least two elementary parametric surfaces, across a common edge, is likely to be less than the required continuity Gi. The process further comprises, for each singular vertex, e.g. extraordinary vertex, a step of defining a system of equations linking parameters of the parameterized surfaces across edges joined to the vertex and enforcing the required geometrical continuity across the joined edges. Said parameters include for example position coordinates of the usually called "control points". The process then comprise a step of solving the system of equations to obtain the parameters. Said singular vertex joins at least one edge across which the continuity between adjacent elementary surfaces is less than the required continuity Gi.

Thus, the above algorithm is local in spirit, a system of equations is defined and solved for each extraordinary vertex. It further considers both open and closed vertices; open vertices are thus not discarded. In addition, formulating local equations allows for a linear resolution, which in turn critically simplifies and speeds up the process. Upon completion of the process, the target continuity is reached, owing to the nature of said systems of equations.

In a preferred embodiment, the parameterized elementary surfaces provided are B-splines and the parameters for the solving step are the positions of the control points of the B-splines. This is one possibility for allowing the problem to remain a linear problem.

In a still preferred embodiment, at the step of defining the system, coefficients in the defined system of equations may be set as constants or, still, according to the type of singular points. Said coefficient may for example be given a polynomial form, affected by the relative lengths of the edges and by angles between the edges. The skilled person would then adjust said coefficient, for example by trial and error, according to the desired surface visual quality. Thus, since the coefficients are set before solving the system, the solving problem remains linear.

Notice that, in a variant, the above parameters may include some of the coefficients, for example upon user request, making the problem at least partly non-linear. Though non-linearity would in this case add an extra-cost in solving, the "solved" coefficients would be improved as regards the continuity required.

The foregoing has outlined rather broadly the features and advantages of the present invention in order that the detailed description of the invention that follows may be better understood. Additional features and advantages of the invention will be described hereinafter which reflects the subject of the appended claims. It should be appreciated by those skilled in the art that the conception and specific embodiments disclosed may be readily utilized as a basis for modifying or designing other processes for carrying out the same purposes of the present invention. It should also be realized by those skilled in the art that such equivalent processes do not depart from the spirit and scope of the invention as set forth in the appended claims. The novel features which are believed to be characteristic of the invention, together with further objects and advantages will be better understood from the following description when considered in connection with the accompanying figure. It is to be expressly understood, however, that the figures are provided for the purpose of illustration and description only and is not intended as a definition of the limits of the present invention.

BRIEF DESCRIPTION OF THE FIGURES

For a more complete understanding of the present invention, reference is now made to the following descriptions taken in conjunction with the accompanying drawings, showing.

DETAILED DESCRIPTION

The invention is directed to a process likely to be implemented by a CAD software. User can control the process through a graphical user interface (or GUI) that may be a typical CAD interface, having usual menu bars as well as bottom and side toolbars. Such menu-and toolbars contain a set of user-selectable icons, each icon being associated with one or more operations or functions, as known in the art.

Some of these icons are associated with software tools, adapted for editing and/or representing a modeled object. The software tools in question are further possibly grouped in workbenches. Otherwise put, each workbench comprises a different subset of software tools. In particular, one of these is an edition workbench, suitable for editing geometrical features of the modeled object. In operation, a designer may for example pre-select a part of the object and then initiate an operation (e.g. change the shape, dimension, color, etc.) by selecting an appropriate icon and actuating a suitable tool.

The GUI may for example display data (known as a feature tree) related to the displayed object. Data is typically displayed in the form of a tree, on the left-hand side of the GUI. The GUI may further show other types of graphic tool, for example for facilitating 3D orientation of the displayed object.

"For example, the process of the invention may be implemented in a PLM system equipped with a database, a data storage device and a computer network. The GUI is in this case run on a terminal having a display and memory and being further connected to the computer network, which may benefit from a product data management (PDM) system. The PDM system allows for the management of numerous documents and data, possibly hierarchically interrelated. A plurality of users may thus work in a collaborative way, on different parts/products, using for example similar local applications and a common environment."

Figure 1:
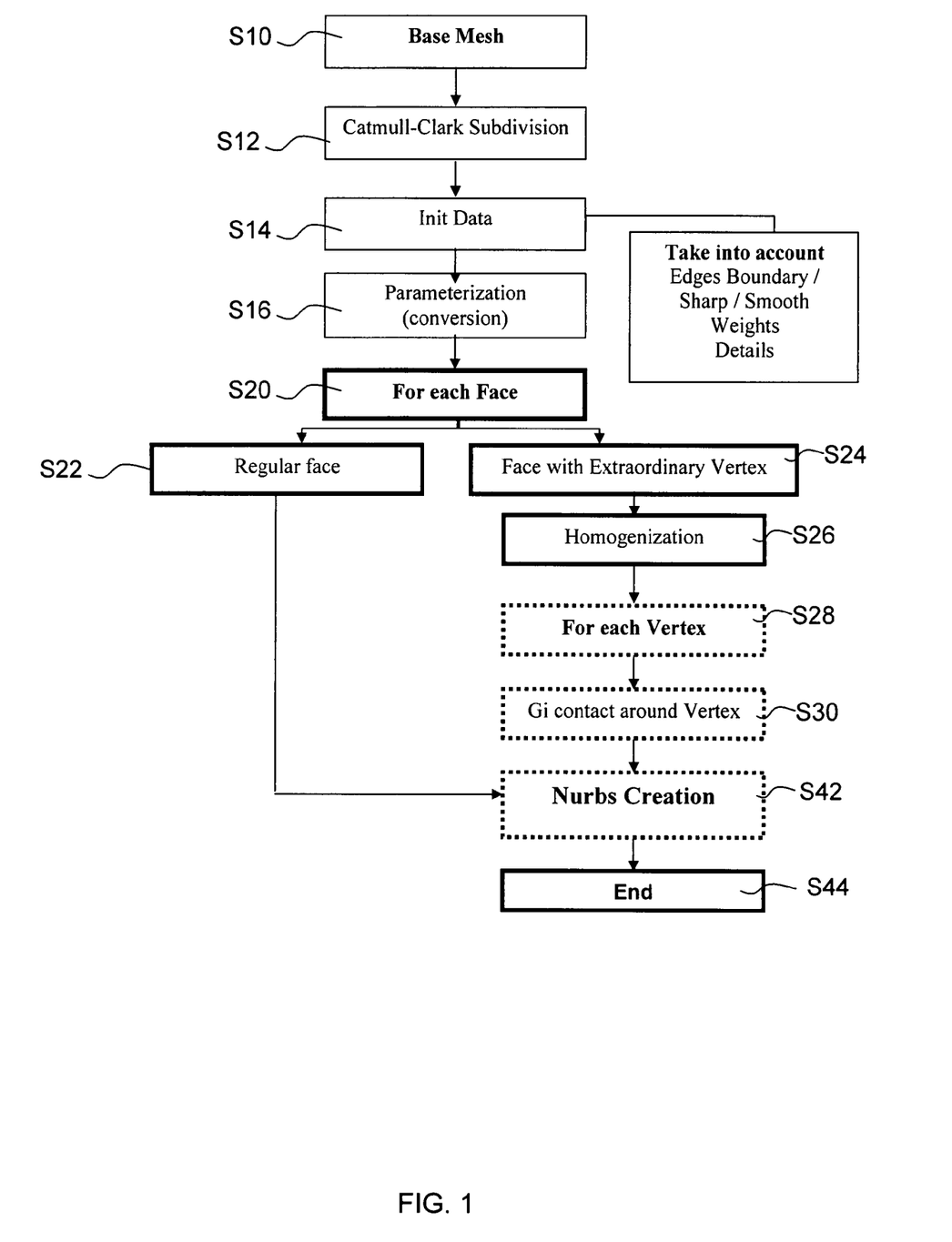
FIG. 1: a flowchart illustrating the preferred embodiment of the invention.

The process described herein is first intended for assisting a designer in creating an isotopologic set of parameterized surfaces from a mesh. Said process may further comprise additional steps for obtaining a surface having a required geometrical continuity Gi, e.g. a G2 continuity. In the following, it is assumed that G2 continuity is contemplated, keeping in mind that the process of the invention applies to any desired level of continuity. FIG. 1 shows a flowchart illustrating the preferred embodiment of the invention.

Figure 3:
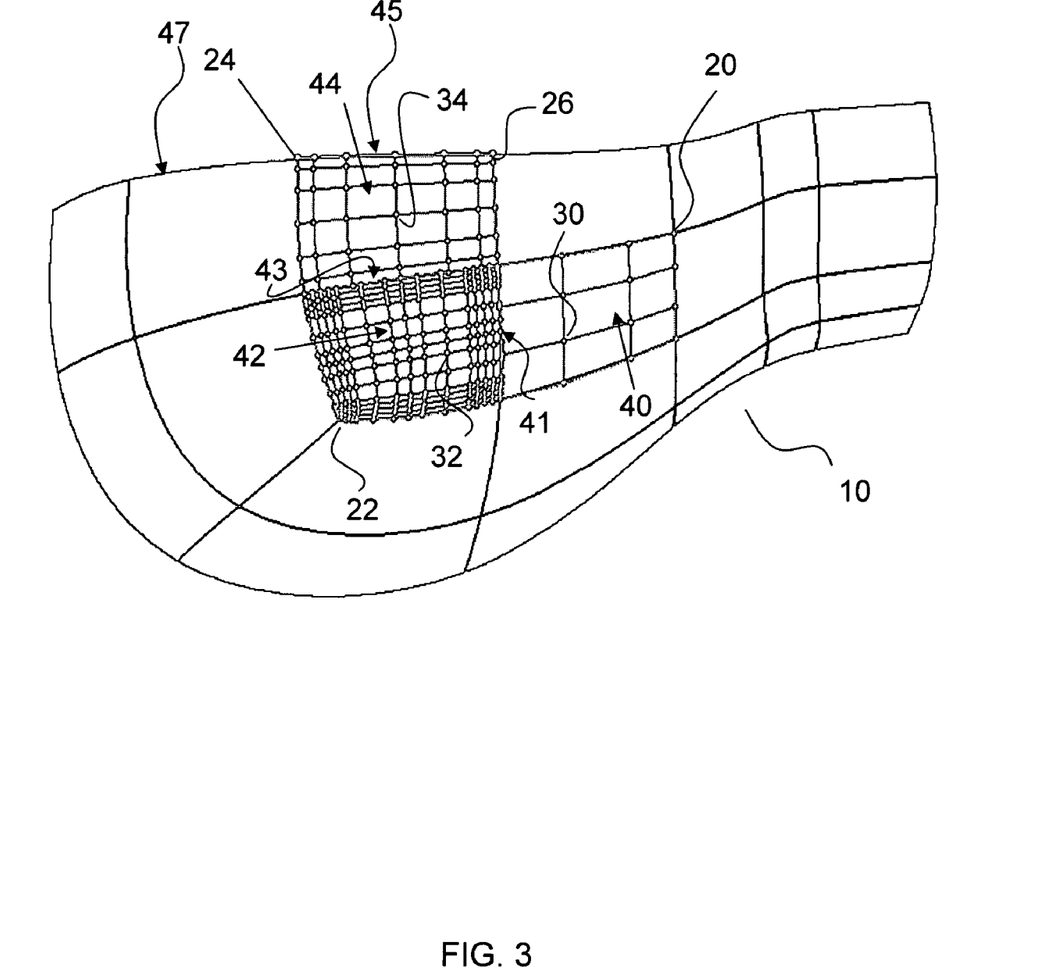
FIG. 3: a parametric surface of a model object, after conversion of faces of the object, wherein different types of elementary surfaces have been applied according to the faces.

In reference to FIG. 1, the process comprises a first step S10 of providing a base mesh modeling a given object with arbitrary topology (see for example object 10 represented in FIG. 3). As usual, said mesh comprises a plurality of vertices connected by edges, said edges defining faces of the object.

Said mesh is subjected to a surface subdivision at step S12, e.g. according to the Catmull & Clark rules. As mentioned earlier, said subdivision enables smooth surfaces to be recovered out of the initial mesh. The number of subdivision may be user-defined, so as to generate a new mesh with more polygonal elements and hence smoother. As outlined before, the resulting Catmull-Clark surfaces are everywhere curvature continuous except at points corresponding to vertices not incident on four edges, that is, extraordinary vertices. Thus, a specific scheme will be described hereafter that restores the desired continuity.

The process comprises another step S14 of data initialization, which typically comprises upgrading default or user definitions. The initialization process may for instance proceed to surface trimming according to default or user-defined parameters. The user may for example enter or modify specific surface details, concerning edge boundaries. Edges may here be sharpen or smoothed, e.g. to mimic rounds/filets features.

Sharpness values may be defined and stored at step S12 or S14, subsequent to Catmull & Clark subdivision. Sharpness values may for example be automatically defined, based on mesh features or, still, may be user-defined. Users would then be proposed to enter non-default values of sharpness where needed (specific vertices or edges); a default value of sharpness being assumed anywhere else.

Next, what is here broadly called a parameterization step (or conversion) occurs at S16. Upon completion of said parameterization step, the process provides a set of parametric elementary surfaces with edges joined by vertices. Such elementary surface will have an internal continuity Cj at least equal to the required continuity G2. For example, if the required continuity is G2, the internal continuity of the elementary surfaces produced is at least C2. For the sake of clarity, a C2 internal continuity requirement is assumed in the following. Providing C2 internal continuity improves the quality of the rendered surface, for example with respect to the usual C1 internal continuity.

Notice that the geometrical continuity of the object, as obtained upon completion of the parameterization step, is determined by the two elementary surfaces having the lower continuity across their common edge. Thus, at this stage, the geometrical continuity is typically less than G2 (the required continuity).

Said parameterization step S16 comprises a conversion step, in which the subdivision surface is converted into a set of elementary surfaces. As a consequence of this conversion process, each initial face of the base mesh is converted into an elementary surface. Hence, a face-surface mapping is ensured, so that the initial topology of the base mesh is respected. As a result, the management of the modeled object is made simpler.

The result of said conversion step is for example illustrated in FIG. 3, showing a parametric surface of a model object 10, wherein different types of surfaces 40, 42, 44 have been applied according to the initial faces of object 10. Surfaces 40 and 42 (respectively 42 and 44) have a common edge 41 (respectively 43). References 30, 32, 34 denote control points, as obtained upon completion of the face conversion.

As to be seen, vertices comprise vertices of valence 4 (see for example vertex 20) and vertices of valence different from 4 (that is, extraordinary vertices, see e.g. 22, 24). Yet, a distinction is made here as regards vertex 22, which lies in the plain surface of the object 10, with respect to vertices 24, 26, lying on a sharp edge on top of the object 10 (notice that, is fact, vertices 24, 26 are at the crossing of two sharp edges 45, 47). However, an extraordinary vertex with valence 3 connected by two sharp edges is usually not considered as irregular. Thus, while vertex 22 will hereafter be denoted as an "irregular vertex", the vertex 24 will instead be contemplated as a (semi) regular vertex (thus not considered as irregular), as concerns the conversion step. However, for other purposes that will be described later, a different classification scheme will be adopted (one will later speak of "singular" vertices, not to be confounded with the above "irregular" vertices).

Furthermore, as mentioned above, the mesh may be associated with sharpness values defined on vertices or edges before conversion (for example at step S12 or S14). Said sharpness is representative of the local attractiveness of its corresponding vertex or edge. For example, the non-sharp edges 41, 43 will be attributed a default value "0". At variance with edge 41 and 43, edge 45 may for example be attributed a non-default value of "1", as the later draws a sharp frontier edge of the object 10. Sharpness values may be binary, as in the above example. Preferably however, sharpness values are stored as integer values ranging between 0 and 100, the later indicating a maximal sharpness. Various algorithms may be called to determine such a sharpness value, for example according to differences between the initial base mesh and the limit subdivision surface.

Based on said defined sharpness values and nature of the vertices, the process may next provide different types of parametric surfaces to apply during the conversion step, so as to adapt to various types of faces present in the base mesh and recover a progressive parameterization.

For example, a first type of parametric surface 40 is applied where an initial face is found that comprises regular vertices 20 and edges 41 having a default value. Next, for the face comprising the sharp edge 45, that is, with a non-default value of sharpness, it is applied a second type of parametric surface 44. Notice that the corresponding face comprise both regular vertices and semi-regular vertices 24, 26 (which are here not considered as irregular). Finally, a third type of surface is applied to that face comprising the irregular or extraordinary vertex 22.

Notice that since faces with regular vertices and at least one vertex or edge with a non-default value of sharpness are explicitly taken in consideration by the conversion algorithm, said conversion applies for both closed and open vertices of a mesh.

As we shall see now, the complexity of surface applied is chosen in respect of the local value of sharpness and nature of vertices, whereby the sophistication of the surface applied is locally optimized. In particular, the third type of surface 42 has the larger number of control points 32, whereas the number of control points 30 of the first type of parametric surface 40 is less than the number of control points 32, 34 of both the second and third types of surface 42, 44. In other words, the respective mesh of control points are more or less dense according to the type of surface applied.

The density of control points may for example be computed based on sharpness values attributed (a value "0" would lead to a standard density, whereas a non-default value, e.g. "1" or "100" would give rise to an increased density).

The control points can be afterwards moved so as to locally modify the surfaces, for example to reach a given geometric continuity requirement between two patches of parametric surfaces. Faces with regular vertices and non-sharp edges do not give rise to lacks of continuity, so that less dense surfaces can be applied thereon. In contrast, discontinuities are likely to appear near extraordinary vertices, so that a network of denser control points should be provided to the respective surfaces so as to allow for recovering the required continuity.

Inoperative control points are hence discarded, allowing for accelerating subsequent steps, to be described now.

Referring back to the flowchart of FIG. 1, once different types of surface have been provided at step S16, the algorithm will consider each face and proceed to distinct treatment depending on whether faces have an extraordinary vertex or not, steps S20-24.

When an extraordinary vertex is found, the process performs an intermediate step S26 of homogenization, where details for subsequent parts of the algorithm are fixed up. For example, it may here be proceeded to a change in the formalism, e.g. passing from B-splines to Bezier, in order to speed up steps to come.

Then, for each extraordinary vertex (S28, each extraordinary vertex being here considered as "singular" vertex), a specific scheme is implemented to recover the required continuity G2 (S30-44). Such a scheme is now described in reference to FIG. 2.

Figure 2:
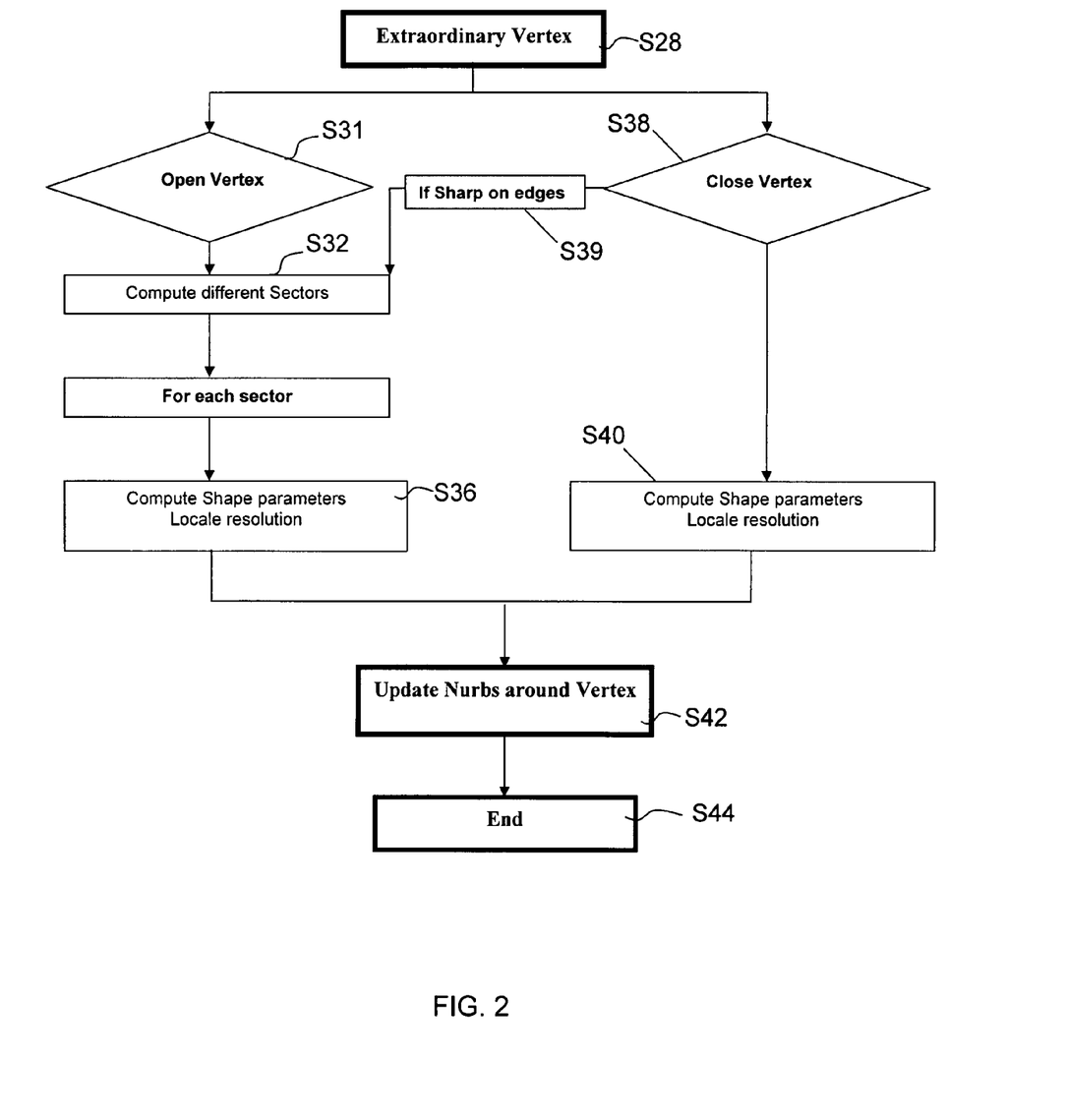
FIG. 2: a flowchart illustrating a specific treatment of an extraordinary vertex, in view of satisfying a given geometrical continuity requirement.

First, said scheme makes a distinction between open vertices, closed vertices and closed vertices connected to sharp edges (S31, S38-40 and S38-39, respectively).

When a closed vertex is detected, it is defined a system of equations linking parameters (e.g. position coordinates of the "control points") of the elementary surfaces across edges joined to said vertex and enforcing the required continuity across the edges connecting said closed vertex. Coefficients of the equations are then computed and the equations solved, as will be detailed later (S38-40).

For an open vertex (S31), different sectors are computed at S32, according to edges joining said open vertex. A sector is determined as the space delimited by two proximate sharp edges joining said open vertex. However, if only one sharp edge is present, only one sector is determined, which comprises the space spanned by the cycle of edges surrounding said vertex. A system of equations will in this case be defined for each of the computed sectors, enforcing the required geometrical continuity across the joined edges within the sectors (sharp edges are therefore not considered).

Next, regarding the system of equations defined, said system links parameters of the elementary surfaces across all pertaining edges joined to said vertex. Notice that the edges in question amount to all connecting edges in the case of a closed vertex, whereas they restrict to those pertaining to a single sector in the case of open vertices or closed vertices joined by a sharp edge.

Said equations enforce the required geometrical continuity across the joined edges. In particular, a set of equations is defined for each considered vertex; the problem sizes hence according to the number of considered vertices. Equations follow from fixed constraints, which are explained now.

Figure 5:
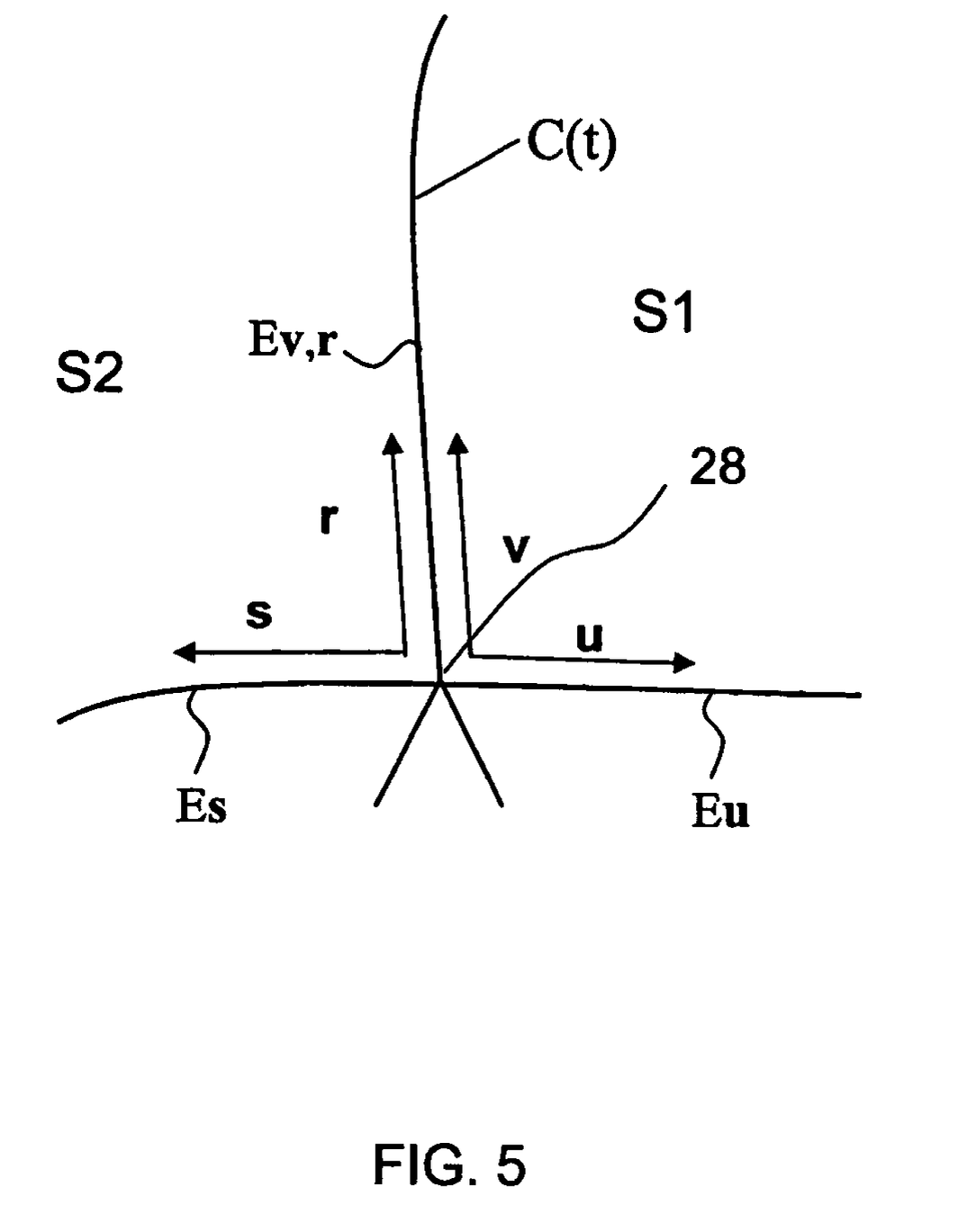
FIG. 5: an extraordinary vertex and two elementary surfaces, together with system components necessary for deriving continuity equations.

In reference to FIG. 5, we consider two abutting B-spline surfaces S1 and S2, as well as unit vectors u, v, r, s, defining local directions of edges Eu, Ev,r, Es, from the extraordinary vertex 28. In this example, vertex 28 is singular as it joins the edge Ev,r, across which the continuity between S1 and S2 is assumed less than the required continuity G2. The Using usual notations, the G0 continuity condition yields:

$$S1(0,v)=S2(r,0)=C(t), \qquad (1)$$

where C(t) is the curve common to S1 and S2. The G1 continuity implies the following condition:

$$\alpha(t)\frac{\partial S1(0, t)}{\partial u} + \beta(t)\frac{\partial S2(t, 0)}{\partial r} + \gamma(t)\frac{\partial S2(t, 0)}{\partial s} = 0, \qquad (2)$$
$$\alpha(t), \gamma(t) > 0,$$

or equivalently, $$\alpha(t)\frac{\partial S1(0, t)}{\partial u} + \beta(t)\frac{\partial S1(0, t)}{\partial v} + \gamma(t)\frac{\partial S2(t, 0)}{\partial s} = 0, \qquad (3)$$

where $\alpha, \beta, \gamma$ are shape parameters, that is, the coefficients of the continuity condition equation, possibly depending on t, that will be discussed later. Next, assuming condition of eq. (2) or (3) being satisfied, enforcing G2 continuity gives the following condition:

$$\alpha^2\frac{\partial^2 S1}{\partial u^2} + \gamma^2\frac{\partial^2 S2}{\partial s^2} + 2\beta\gamma\frac{\partial^2 S2}{\partial r\partial s} + \beta^2\frac{\partial^2 S2}{\partial r^2} + \delta\frac{\partial S2}{\partial r} + \eta\frac{\partial S2}{\partial s} = 0, \qquad (4)$$

where notations (0,t), (t, 0), etc. have been skipped for clarity.

The above equations implicitly involve position coordinates of control points of the surfaces.

So far, not much has been said about the shape parameters, that is, the coefficients $\alpha, \beta, \gamma, \ldots$; these may for instance be set as constants $\alpha_0, \beta_0, \gamma_0$, etc. or, still, be set according to the type of singular points (step S36 or S40), possibly user-defined.

One may yet choose these coefficients $\alpha, \beta, \gamma, \ldots$ as slowly varying polynomials, pre-parameterized (for example by trial and error) so as to generally improve the final graphic quality.

Figure 4A:
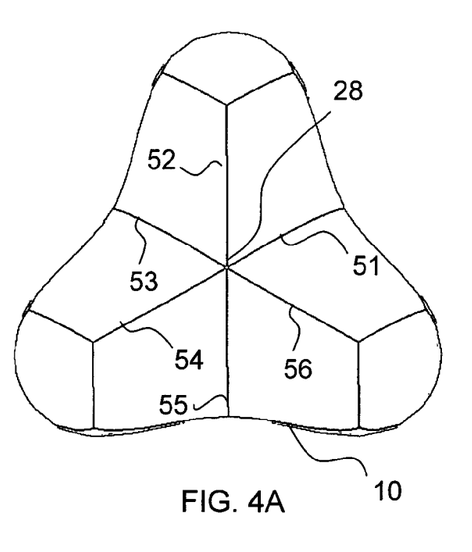
FIG. 4A: a parametric surface of another model object, with elementary surfaces having edges joining an extraordinary vertex of valence 6.
Figure 4B:
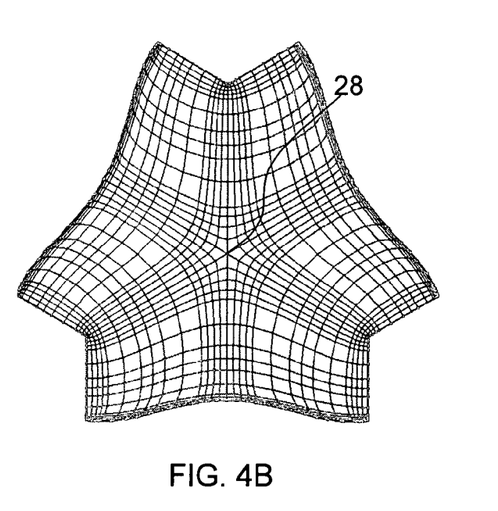
FIG. 4B: the parametric surface of FIG. 4A, together with a distribution of control points of elementary surfaces, as obtained upon completion of the process.
Figure 4C:
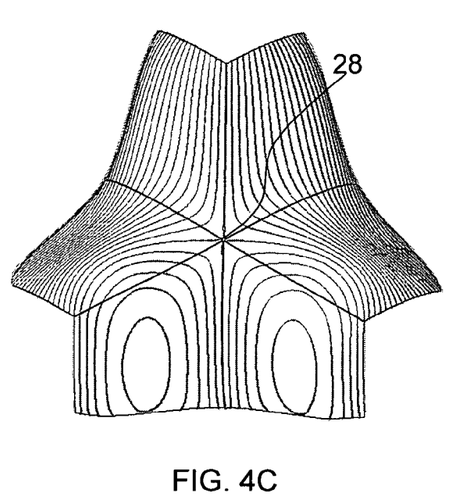
FIGS. 4C and 4D: respectively tangent and normal highlight contours of the parametric surface of FIG. 4A, as obtained upon completion of the process.
Figure 4D:
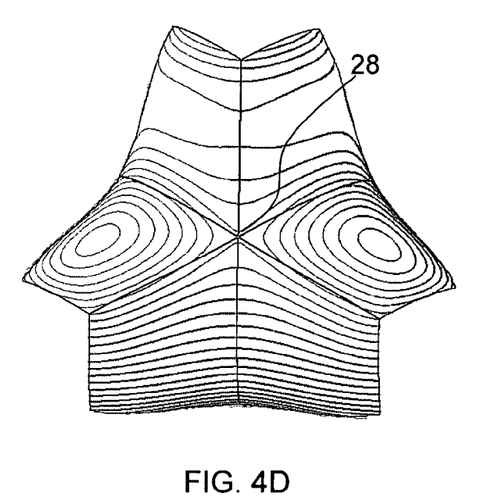

For example, referring to FIG. 4A, convenient numerical values of $\alpha_0, \beta_0, \gamma_0, \delta_0$ and $\eta_0$ are 1.0,-0.618034, 1.0, 0.0 and 0.0, respectively.

Said coefficient may still be given a low-order polynomial form, affected by the relative lengths of the local edges and angles between the edges, as mentioned above. Yet, these are computed before solving the system of equations (S36 or S40), whereby solving said set of equations remains a linear problem, e.g. growing linearly with the number of singular vertices. Various other types of coefficient form could be contemplated by the person skilled in the art.

Upon completion of the solving step, NURBS surrounding each singular vertices are updated according to the new control point positions returned (S42).

Notice that closed vertices joining a sharp edge are detected by the above scheme (S38-39) and subsequently treated in the same way as open vertices (owing to topological similarities between both cases), so as to recover the required continuity. Thus, both close and open (yet joining a sharp edge) extraordinary vertices are considered as "singular" vertices and treated similarly as regards the present scheme.

In contrast, the conversion step (S16) described earlier makes a distinction between face comprising an irregular vertex (such as an extraordinary open vertex) and a vertex joining a sharp edge (semi-regular).

The algorithm stops at step S44.

Thus, upon completion, the above scheme returns the target parameters (position coordinates of involved control points) and modifies accordingly the surface, so as to obtain the required continuity, here G2. As a result, since curvatures at the joint between abutting surfaces are (at least) proportional, the resulting joint is seamless and invisible.

This is exemplified in FIG. 4A-D, showing a parametric surface of a model object 10, with elementary surfaces having edges 51-56 joining an extraordinary vertex 28 of valence 6, with either distribution of the control points (FIG. 4B), tangent or normal highlight contours, as obtained upon completion of the process.

As can be seen (FIG. 4B), the obtained distribution of control points shows the typical seamless contours obtained under G2 condition. The quality of the surface that is reached further reflects in the tangent and normal highlight contours of FIG. 4C-D.

As seen, the algorithm generally described above allows for achieving a given geometrical continuity, is local in spirit, further considers both open and closed vertices and allows for a linear solving. Such an algorithm ensures that the initial topology of the base mesh is respected, owing to the face-surface mapping invoked. Here a face-by-face approach is contemplated. In contrast, since the geometrical continuity is recovered through a local coupling scheme (around each singular vertex), the number of required control points is less than that required when adopting a surface-by-surface approach. The invention therefore critically departs from the usual existing procedures.

The invention claimed is:

1. A computer-implemented process for creating, from a mesh, an isotopologic set of parameterized surfaces, comprising the steps of:

providing with a computer a mesh having:
a plurality of vertices connected by edges, defining faces, the vertices comprising regular vertices of valence 4 and irregular vertices of valence different from 4;
sharpness values defined on vertices and/or edges, wherein said sharpness is representative of a local attractiveness of said vertices and/or edges on a surface modeled by said mesh;
providing with said computer at least three different types of parameterized surfaces;
for a face with only regular vertices and only a first value of sharpness on vertices and/or edges of the face, applying with said computer a first type of parameterized surface;
for a face with only regular vertices and at least one vertex or edge with a second value of sharpness, applying with said computer a second type of parameterized surface; and
for a face with at least one irregular vertex, applying with said computer a third type of parameterized surface.

2. The process of claim 1, wherein the mesh provided is subdivided according to Catmull-Clark rules.

3. The process of claim 1, wherein the parameterized surfaces include spline surfaces.

4. The process of claim 1, wherein each of said three types of parameterized surfaces have a number of control points, and wherein the number of control points of the first type of parameterized surface is less than the number of control points of the second and the third types of parameterized surface.

5. The process of claim 4, wherein the number of control points of the third type of parameterized surface is greater than the number of control points of the first and second types of parameterized surface.

6. The process of claim 1, wherein the first, the second, and the third types of surfaces applied are of B-spline type, with different nodal vectors.

7. The process of claim 1, wherein at the steps of applying surfaces: each the parameterized surface applied has an internal continuity Cj at least equal to a required geometrical continuity Gi, the geometrical continuity between at least two parameterized surfaces across a common edge of said two surfaces being less than the required continuity Gi,
the process further comprising the steps, for each singular vertex, of:
defining a system of equations linking parameters of the parameterized surfaces across edges joined to the vertex and enforcing the required geometrical continuity across the joined edges; and
solving the system of equations to obtain the parameters;
wherein a singular vertex joins at least one edge across which the continuity between adjacent elementary surfaces is less than the required continuity Gi.

8. The process of claim 7, wherein:
the parameterized elementary surfaces provided are B-splines and have a number of control points; and
the parameters for the solving step are position coordinates of the control points of the B-splines.

9. The process of claim 8, wherein, at the step of defining the system, coefficients in the system of equations defined are set as constants.

10. The process of claim 8, wherein, at the step of defining the system, coefficients in the defined system of equations are set according to type of singular points.

11. The process of claim 7, wherein the parameterized elementary surfaces provided are B-splines and the parameters for the solving step are:
coefficients in the equation enforcing the required continuity; and
position coordinates of control points of the B-spline.

12. A computer-implemented process for creating from a mesh an isotopologic set of parameterized surfaces, comprising the steps of:
providing with a computer a Catmull-Clark subdivided mesh having:
a plurality of vertices connected by edges, defining faces, the vertices comprising regular vertices of valence 4 and irregular vertices of valence different from 4;
a sharpness value defined on at least one vertex or edge, with a default value, the sharpness being representative of the attractiveness of the vertex or edge on a surface modeled by the mesh;
providing with said computer at least three different types of parameterized surfaces;
for a face with only regular vertices and a default value of sharpness on vertices and edges of the face, applying with said computer a first type of parameterized surface;
for a face with only regular vertices and at least one vertex or edge with a non-default value of sharpness, applying with said computer a second type of parameterized surface; and
for a face with at least one irregular vertex, applying with said computer a third type of parameterized surface;
wherein:
each of said three types of parameterized surfaces have a number of control points, and wherein the number of control points of the third type of parameterized surface is greater than the number of control points of the second type of parameterized surface, the later being larger than the number of control points of the first type of parameterized surface.

13. A data storage device comprising stored instructions for causing a computer system to perform a process for creating, from a mesh, an isotopologic set of parameterized surfaces, said instructions comprising instructions for causing the computer system to:
model a mesh comprising:
a plurality of vertices connected by edges, defining faces, the vertices comprising regular vertices of valence 4 and irregular vertices of valence different from 4;
sharpness values defined on vertices and/or edges, wherein said sharpness is representative of a local attractiveness of said vertices and/or edges on a surface modeled by said mesh;
provide at least three different types of parameterized surfaces where:
for a face with only regular vertices and only a first value of sharpness on vertices and/or edges of the face, said instructions comprise instructions to apply a first type of parameterized surface;
for a face with only regular vertices and at least one vertex or edge with a second value of sharpness, said instructions comprise instructions to apply a second type of parameterized surface; and
for a face with at least one irregular vertex, said instructions comprise instructions to apply a third type of parameterized surface.

* * * * *